(12) United States Patent
Oboril et al.

(10) Patent No.: US 12,475,584 B2
(45) Date of Patent: Nov. 18, 2025

(54) AUTONOMOUS AGENT OPERATION USING HISTOGRAM IMAGES

(71) Applicant: Intel Corporation, Santa Clara, CA (US)

(72) Inventors: Fabian Oboril, Karlsruhe (DE); Cornelius Buerkle, Karlsruhe (DE)

(73) Assignee: REALSENSE LTD., Tel Aviv (IL)

( * ) Notice: Subject to any disclaimer, the term of this patent is extended or adjusted under 35 U.S.C. 154(b) by 625 days.

(21) Appl. No.: 17/856,118

(22) Filed: Jul. 1, 2022

(65) Prior Publication Data

US 2022/0366586 A1 Nov. 17, 2022

(51) Int. Cl.
*G06T 7/55* (2017.01)
*G06T 7/20* (2017.01)

(52) U.S. Cl.
CPC .............. *G06T 7/55* (2017.01); *G06T 7/20* (2013.01); *G06T 2207/20072* (2013.01); *G06T 2207/20221* (2013.01)

(58) Field of Classification Search
None
See application file for complete search history.

(56) References Cited

U.S. PATENT DOCUMENTS

| | | | |
|---|---|---|---|
| 12,235,659 B2* | 2/2025 | Ebrahimi Afrouzi | ..... A47L 9/30 |
| 2021/0302956 A1* | 9/2021 | Sudhakaran | ......... G05D 1/2464 |
| 2022/0113699 A1* | 4/2022 | Buerkle | ............ G05B 19/4183 |
| 2024/0428560 A1* | 12/2024 | Buerkle | ................ G06V 20/70 |

* cited by examiner

*Primary Examiner* — Dov Popovici
(74) *Attorney, Agent, or Firm* — S.J. INTELLECTUAL PROPERTY LTD.

(57) ABSTRACT

An apparatus, including an interface configured to receive images with measured distance information of an environment in which an autonomous agent is designed to operate; and processing circuitry that is configured to: generate distance histogram images over time, wherein the distance histogram images include the measured distance information in corresponding picture elements; perform a distribution-based outlier analysis on the distance histogram images to classify each picture element of each of the received images as either an outlier picture element representing a dynamic object or a non-outlier picture element representing a static portion of the environment; and track a dynamic object over time and cause an action by the autonomous agent if it is determined, based on a result of the distribution-based outlier analysis, a distance between the dynamic object and the autonomous agent is less than a predefined distance.

25 Claims, 5 Drawing Sheets

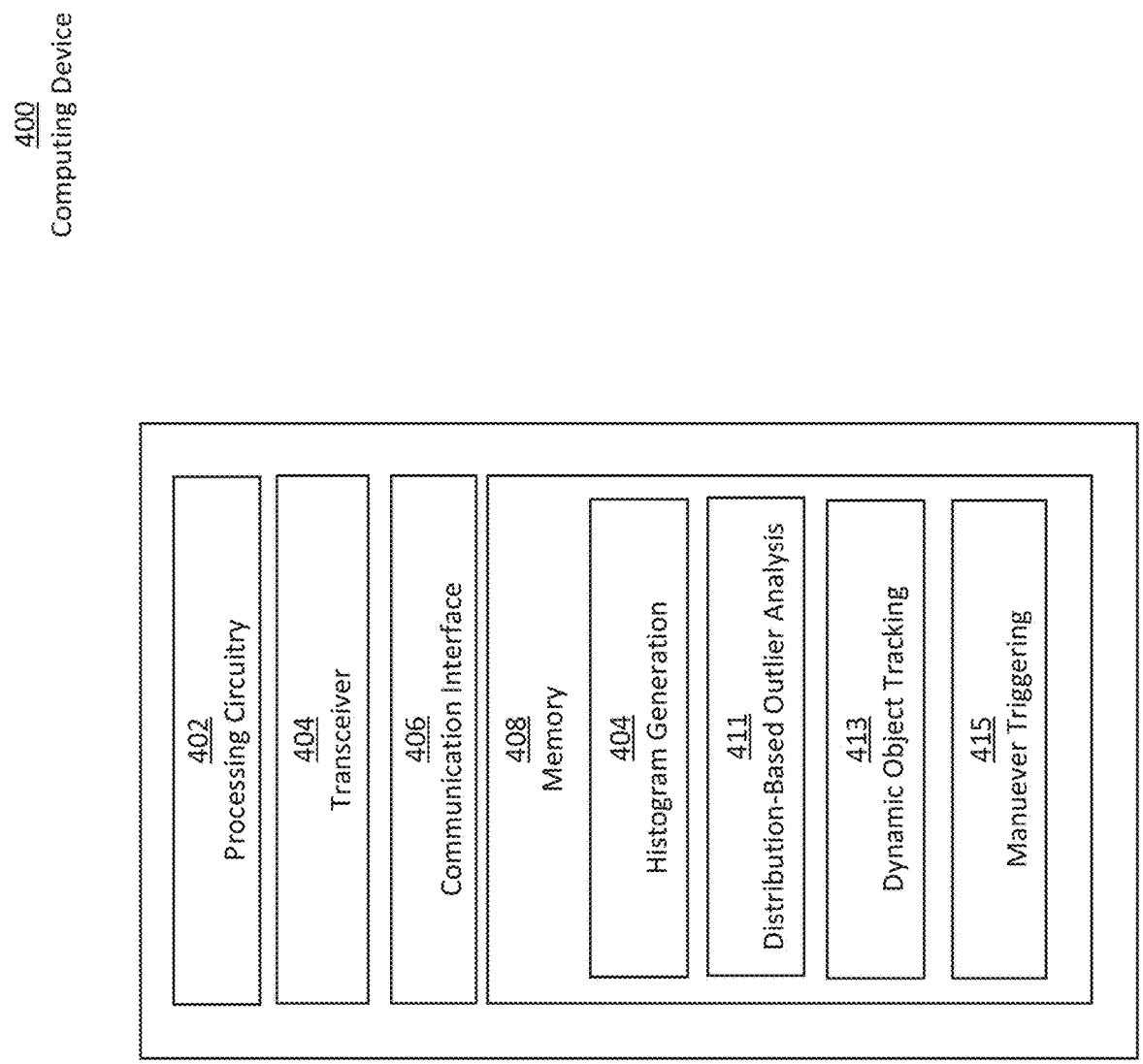

AUTONOMOUS AGENT OPERATION USING HISTOGRAM IMAGES

TECHNICAL FIELD

Aspects described herein generally relate to autonomous agent operation and, more particularly, to autonomous agent safe operation using histogram images.

BACKGROUND

Safe collaboration among autonomous agents and humans remains a challenge in the deployment of autonomous agents, such as autonomous robots (ARs). A typical approach to tackle this problem is to erect a static safety cage around an AR in combination with installing on-AR sensors. When a person or object enters the cage, the AR is forced to cease operation. Static safety cages detract from closer collaboration among robots and human co-workers. In addition, the on-AR sensor systems require expensive safety companions to ensure safe operation, and are limited in their operational use by blind spots. There is thus a desire for a solution that does not require a static safety cage, includes infrastructure sensors that mitigate blind spots, yet ensures safe operation.

BRIEF DESCRIPTION OF THE DRAWINGS

FIG. 4 illustrates a block diagram of an exemplary computing device agent in accordance with the disclosure.

DESCRIPTION OF THE ASPECTS

The present disclosure is directed to a cloud/edge-based system that receives images with measured distance information from stationary sensors mounted in infrastructure of an environment of an autonomous agent. The received distance information is converted into histogram images, which are pixel-wise histograms of the received distance measurements over time. These histogram images are used to separate the environment into static and dynamic elements by performing a distribution-based outlier analysis. By knowing the autonomous agent's positions (reported to the cloud/edge by the autonomous agents), a safety analysis can be performed, and upon detection of safety violations, the system can send safety commands to the corresponding autonomous agent.

Figure 1:
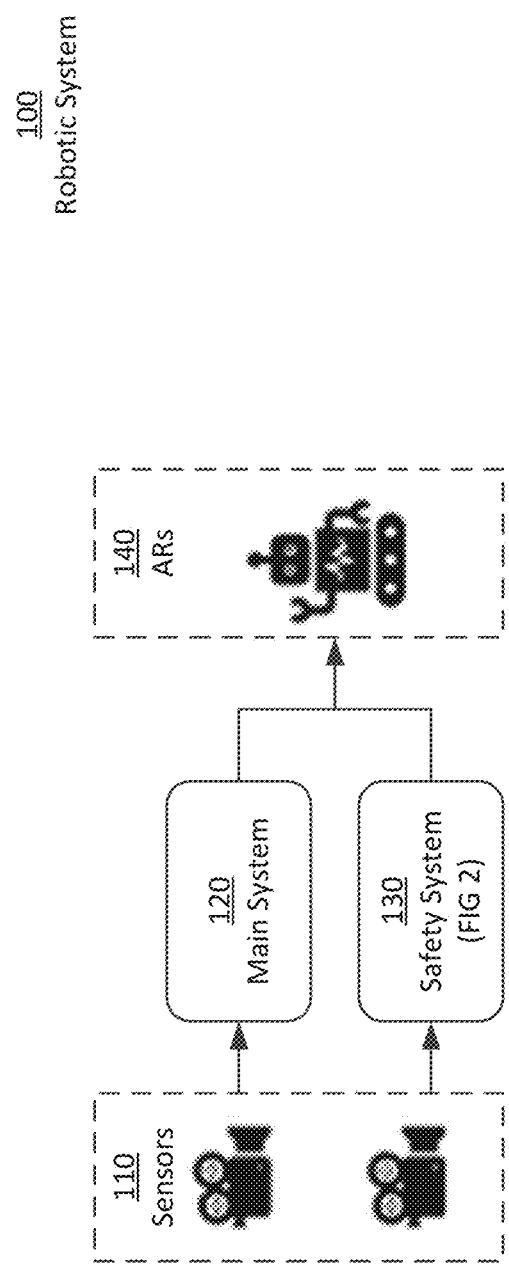
FIG. 1 illustrates a block diagram of a robotic system in accordance with aspects of the disclosure.

FIG. 1 illustrates a block diagram of a robotic system 100 in accordance with aspects of the disclosure. The robotic system 100 comprises sensors 110 and autonomous agents (e.g., autonomous robots (ARs)) 140. In future industrial facilities, a plethora of different sensors 110 will be mounted in the infrastructure to monitor the robotic environment. These sensors 110 may comprise stereo cameras, standard RGB cameras, LiDAR sensors, radar sensors, imaging radar sensors, and/or the like covering different fields-of-view (FOV). These sensors 110 will stream their data to a cloud/edge-based central computing instance for processing.

In order to safely eliminate safety cages, the processing is split into two streams, a main system 120 for the main operation and a safety system 130 that ensures safety. The aspects disclosed herein target the safety system 130, which detects safety violations (e.g., object too close to AR 140) and then triggers an AR emergency maneuver. Thus, the safety system 130 determines distances to obstacles in a safe and robust manner.

Figure 2:
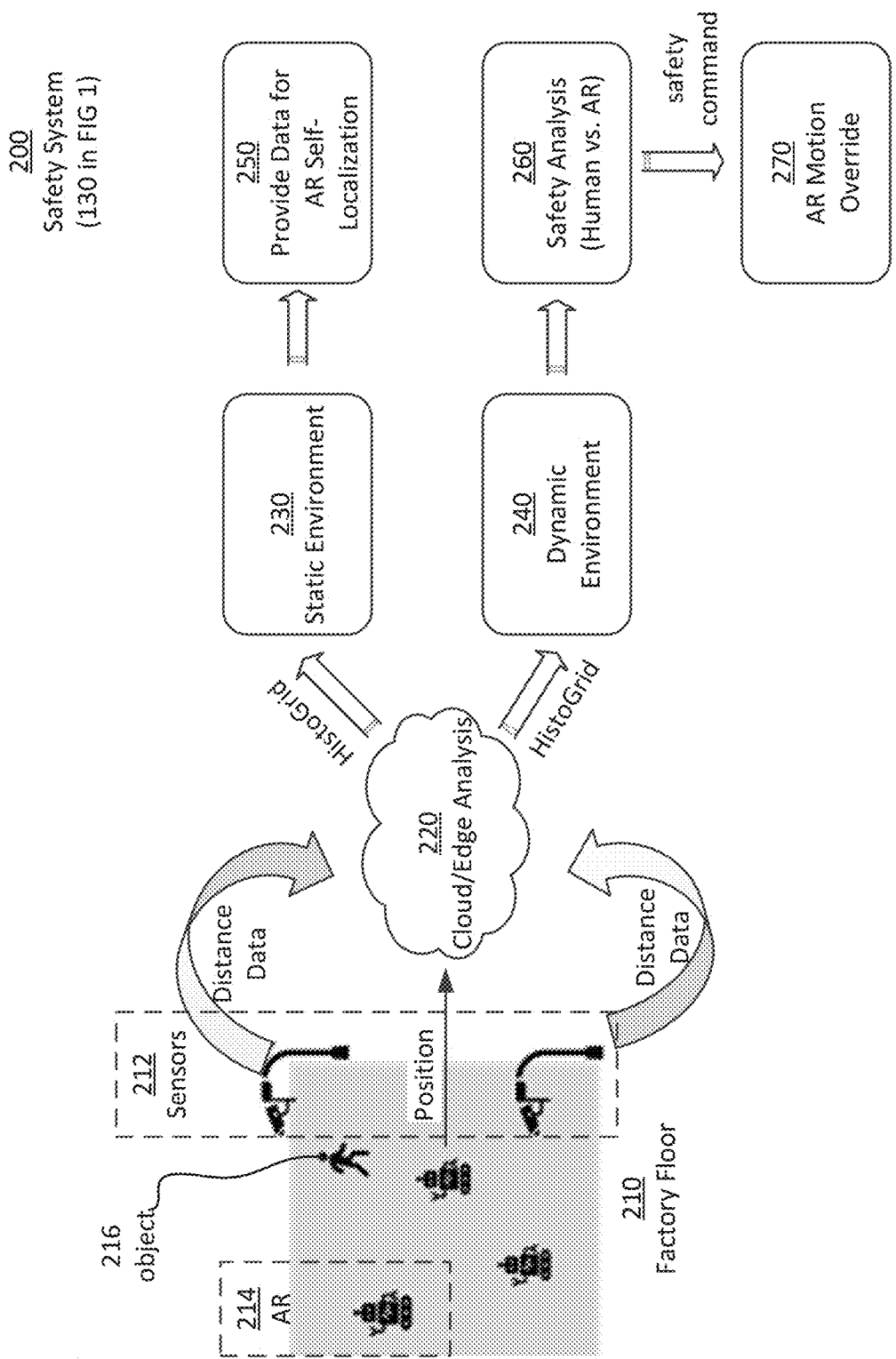
FIG. 2 illustrates a block diagram of a safety system in accordance with aspects of the disclosure.

FIG. 2 illustrates a block diagram of a safety system 200 in accordance with aspects of the disclosure.

The safety system 200 (130 in FIG. 1) leverages advantages of cloud robotics in combination with sensors 212 mounted in the infrastructure of a robotic assembly line or equivalent. These stationary sensors 212 provide distance data (i.e., depth and/or height measurements) to cloud/edge-based processing circuitry 220. The sensors 212 may be, for example, high resolution stereo/depth cameras or the like as mentioned above with respect to sensors 110.

The cloud/edge-based processing circuitry 220 translates the distance data into HistoGrids, which are pixel-wise histograms of the received distance measurements over time.

The HistoGrids are used by the cloud/edge-based processing circuitry 220 to separate the environment into elements of a static environment 230 and elements of a dynamic environment 240 by performing a distribution-based outlier analysis. The static environment 230 may be provided to the ARs to simplify AR self-localization 250 as this task is often challenging if dynamic environment elements are present.

The dynamic environment 240 allows the robotic system to adapt automatically to changes in the environment (e.g., pallets that are placed by a worker 216 are initially part of the dynamic environment, but after a short time are treated as a static element). An AR's position may be reported to the cloud/edge processing circuitry 220 by the AR 214 so that a safety analysis 260 may be performed. The multi-view distance information is split into static and dynamic environment elements and used to track distance measurements on a pixel-level over time. Upon detection of a safety violation (i.e., an object 216 is too close to the AR 214), the safety system 130 may send a safety command to the corresponding AR 140 for an AR motion override 270.

Figure 3A:
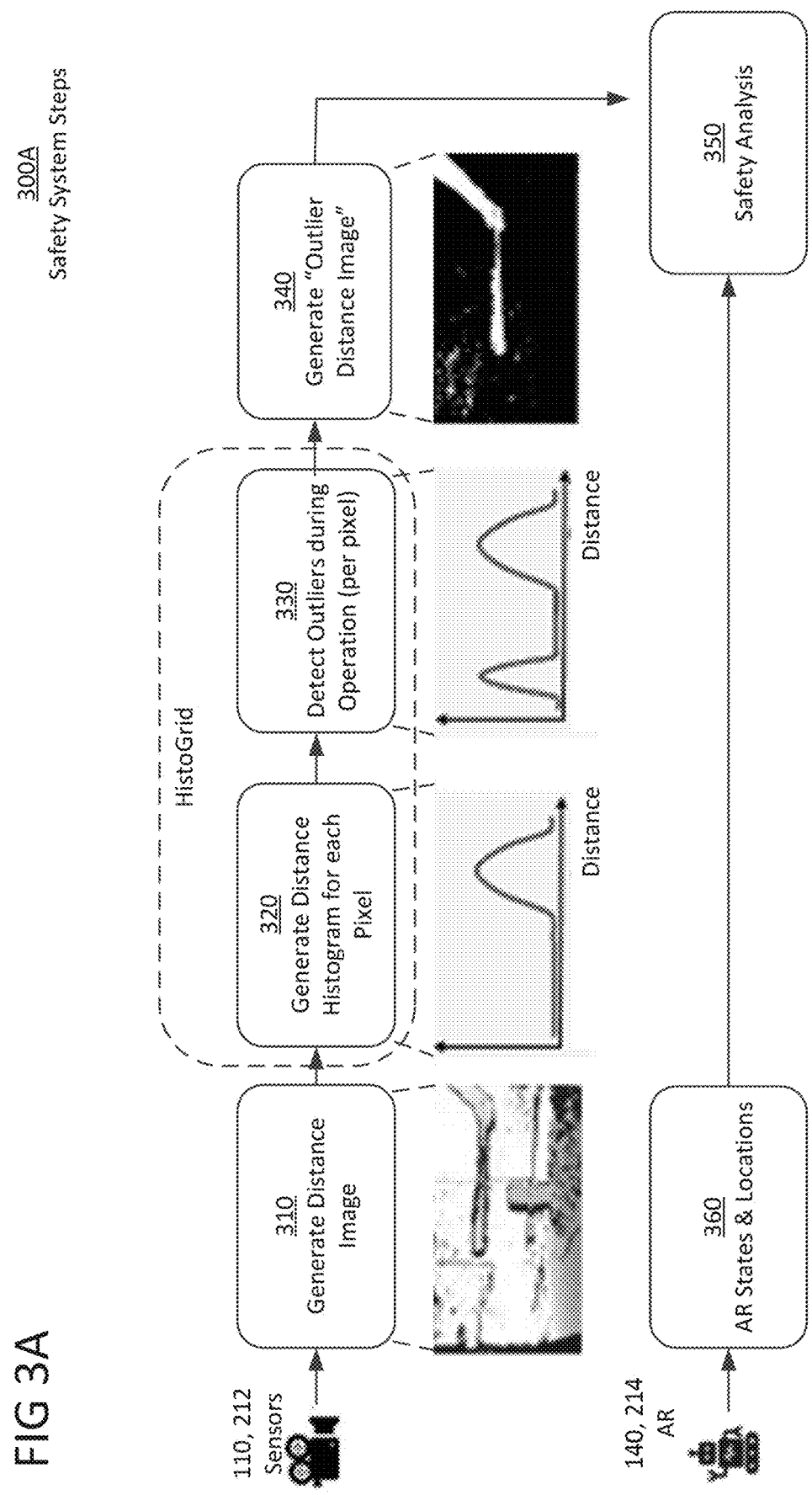
FIG. 3A illustrates a more detailed block diagram of the safety system in accordance with aspects of the disclosure.
Figure 3B:
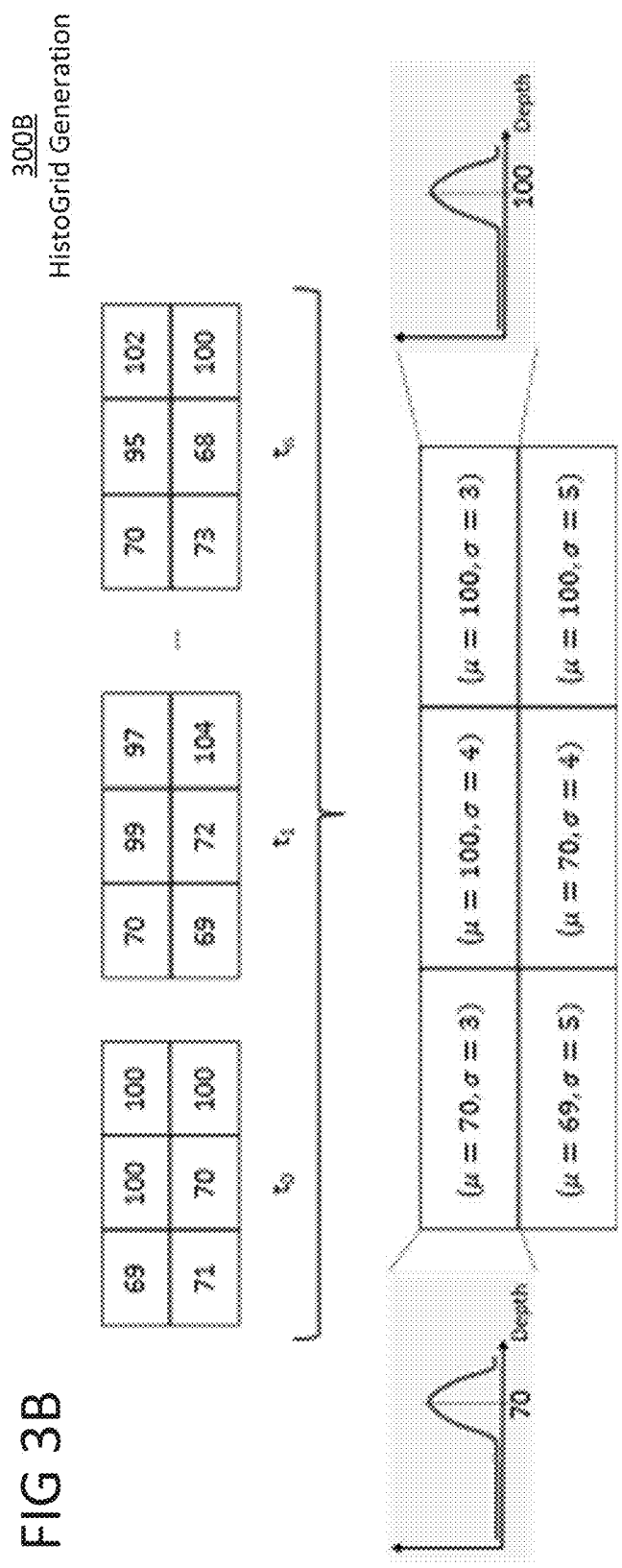
FIGS. 3B and 3C illustrate HistoGrid generation in accordance with aspects of the disclosure.
Figure 3C:
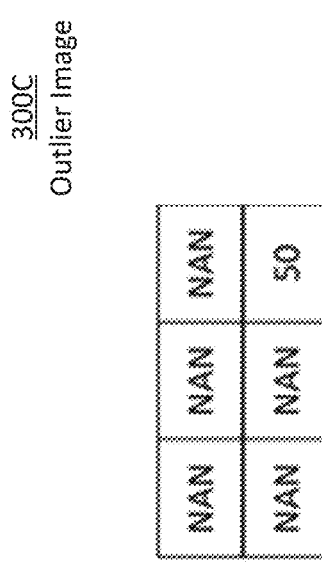

FIG. 3A illustrates a more detailed block diagram of steps of the safety system 200 in accordance with aspects of the disclosure. And FIGS. 3B and 3C illustrate HistoGrid generation 300B in accordance with aspects of the disclosure.

Step 310

During a first step 310, an image with distance information is received from each sensor 110, 212. The sensors 110, 212 may be LiDAR and/or stereo cameras that can provide the distance information natively. Each sensor 110, 212 is handled separately, that is, in this step 310, the sensor information is not fused.

If distance information is not available directly, such as from an RGB camera, algorithms may convert the sensor data into distance images. However, ideally native distance sensors are used. If LiDAR is used, a point cloud may be converted into a distance image by calculating the distance of each reporting measurement point for a given row/column LiDAR beam.

Step 320

For each pixel of each received image, a distance histogram is generated over time (distance measurements over time). The resulting "image of histograms" may be referred to herein as a HistoGrid. As long as the environment is static, these HistoGrids will quickly converge and show a single peak for each pixel for the expected distance to the closest object, as shown in FIGS. 3B and 3C. The pixel-wise distance histograms in this example use Gaussian distributions. Here an L-shaped object is closer to the sensor 110, 212 (around 70 units away), while the remaining pixels measure an opposite wall (around 100 units away).

Step 330

After the initial setup during steps 310 and 320, the safety system 200 may be used during normal operation. In step 330, whenever an object 216 moves closer to the sensor 110, 212, the corresponding pixel histograms will start to show outliers. Using a classical outlier separations approach, outlier pixels may be identified. An example of an outlier separation approach may be, for example, modeling the histograms as Gaussian mixture models, and then checking possible outliers against (μ, σ) with each of the involved distributions. As a result, an outlier distance image including only the dynamic outlier pixels may be generated.

Referring to the example of FIG. 3C, an object appears in the bottom right pixel with a distance of 50, where μ=100 and σ=5. This distance is a clear outlier for the distribution, and thus this pixel is classified as dynamic. The resulting "outlier" image is as shown in FIG. 3C. Pixels that are not classified as outliers are marked as NAN (Not A Number). The pixels that are outliers have their respective measured distances stored therein. The resulting image is limited to distance measurements related to the dynamic parts of the environment. Similarly, an image limited to the static parts of the environment may be generated. Mathematically, this is represented as follows:

$d_{i,j}$ is the distance measured for pixel i,j, and $N(\mu_i, \sigma_i)$ is the distribution for this pixel. For the resulting dynamic image, it holds that:

$$P_{i,j} = \begin{cases} d_{i,j}, & \text{if } d_{i,j} \text{ is an outlier in } N(\mu_i, \sigma_i) \\ NAN, & \text{otherwise} \end{cases}, \quad \text{(Equation 1)}$$

and for the resulting static image it holds that:

$$P_{i,j} = \begin{cases} d_{i,j}, & \text{if } d_{i,j} \text{ is not outlier in } N(\mu_i, \sigma_i) \\ NAN, & \text{otherwise} \end{cases}, \quad \text{(Equation 2)}$$

where μ is the mean and a is the variance, static and dynamic images yield the input distance image.

Step 340

In Step 340, dynamic objects may be separated from the stationary environment elements, even when noise sensor data is used (due to the modelling as distributions/histograms). By fusing the outlier information from multiple sensors 110, 212 with different FOV, a moving human or moving AR arm 216 may be identified. Using location information 360 of where the AR 140, 214 (and its arms) is located (cloud robotics has this information), outliers related to the AR may be ignored or removed, and then only other outliers (e.g., caused by humans) remain.

An example of a complex environment is included in FIG. 3A. Here, a stationary camera 110, 212 was used to monitor the environment including a close object 216 (center of input distance image) where after some time a person moved an arm and a cylinder into the environment. Both, the arm and cylinder are clearly visible on the resulting "outlier image", which includes the distance information (not shown) for each outlier.

Step 350

During step 350, a safety analysis is performed to detect possible safety violations, that is, when a measured distance is less than an acceptable threshold. The safety analysis 350 may be performed at the pixel level or by converting the distance data into the AR's cartesian space. If a safety violation is detected, the safety system 200 may initiate an AR emergency maneuver.

The aspects have been described with respect to pixels, but the disclosure is not limited in this respect. The distance histogram images may be generated to include the measured distance information of any size corresponding cell or picture element, which may include one or more pixels.

The distance information may be in the horizontal direction, the vertical direction, or at an angle. "Distance" information may include a measurement between any two points, and may include depth information and/or height information. Also, the distance may be in a vertical, horizontal, and/or angled direction.

Instead of pixel-wise distance histograms, the histograms may alternatively be generated in a different coordinate system by applying a transformation from image space, for example, into a global three-dimensional space. As a result, it is possible to generate a form of "occupancy" grid in which cells do not have direct occupancy information, but distance histograms.

Further, the output (dynamic versus static) may be used to filter sensor data, for example a three-dimensional LiDAR point cloud. In fact, processing dense sensor data from high density LiDAR or high-resolution cameras is a compute intensive task. Hence, it is an advantage if the amount of data can be reduced in a pre-processing step to only the data that is relevant. Using the aspects of the HistoGrid approach described herein, it is for example possible to remove all particles in a 3D LiDAR point cloud that relate to dynamic objects (or to static environment background). As a result, a smaller point cloud is generated, allowing faster, more efficient processing.

The disclosed aspects may alternatively be applied to outdoor scenarios, such as where infrastructure-based roadside sensors (e.g., LiDAR sensors) are used to monitor road traffic. In this case, the autonomous agent is an autonomous vehicle, and dynamic elements are road users, which may be detected in a similar manner. An autonomous vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, and the like. A more detailed explanation of this traffic monitoring example follows.

The HistoGrid is an occupancy grid that is limited to dynamic objects. However, to account for inherent uncertainties, such as sensor noise, each cell includes not only a binary value (dynamic object=true/false), but also includes a probability that a dynamic object is located in this cell: $P_{dyn} \in [0,1]$. A distance histogram is generated for each cell based on the incoming sensor data.

A cell histogram, which is a cell-based representation of the environment, is generated. Each of the cells has a state indicating whether an object is located therein. Therefore, the sensor measurements (in this example, LiDAR, but not limited thereto) in each cell are aggregated. There may be multiple LiDAR measurements per cell, depending on cell size. The measurements may be associated with the ground floor. In addition, there might be dynamic objects and static obstacles. To aggregate this information, all incoming distance measurements are gathered over time, and a histogram over all measurements and time is generated.

A process of data insertion for a set of distance measurements D starts by excluding information related to objects that are located high above the road surface, and do not block the path of road users (e.g., traffic signals or bridges):

$$D=\{d\}, \quad \text{(Equation 3)}$$

$$D'=\{d_i | d_i < d_{max} \wedge d_i \in D\} \quad \text{(Equation 4)}$$

Bridges will therefore not result in occupied grid cells.

Next for data insertion, the maximum of all remaining measurements is obtained:

$$\hat{d} = \text{Max } D' \quad \text{(Equation 5)}$$

And then for data insertion, a histogram is then updated with d. It is option to skip obtaining the maximum of all remaining measurements of the previous step, and update the histogram using the entire set D', but it would make the following steps more complicated After the cell histogram is created, there is a static scene extraction. More specifically, after a settlement time, the cell histograms will show clear peaks and distributions for all static scene elements. Since only the maximum distance d for each cycle is added to the histogram, there is a single peak. Depending on the type of sensor, time of day when the system is started for the first time, and the weather, the settlement time might vary. However, in general, after a few minutes a clear peak surrounded by a narrow distribution emerges. Assuming that this distribution D is similar to a normal distribution:

$$D \sim \mathcal{N}(\mu, \sigma) \quad \text{(Equation 6)}$$

with a mean μ and variance σ, an indicator that settlement is achieved is that a is in the range of the expected sensor noise (extrinsic and intrinsic). The static elements of the environment are covered by D and any outlier:

$$\hat{d} \in [\mu - k\sigma, \mu + k\sigma], \quad \text{(Equation 7)}$$

which represents a dynamic object.

Similarly, if not just d but all distance measurements are added to the histogram, a set of distributions $\mathcal{S}_D$ emerges.

Mean μ and variance σ are not necessarily constant over time. For example, strong wind on one day can lead to strong vibrations of the mounted sensor, which will result in a larger variance σ compared to a day without any wind. To take this aspect into account, realization does not only estimate the mean μ and variance σ at the beginning until the initial settlement is reached, but instead re-estimates these values on a periodic basis using the most recent measurement cycles, to adapt the parameter values if needed. For this purpose, the mean μ and variance σ are estimated based on a histogram considering all measurements from the beginning until a point in time, and a second time based on a histogram that includes only the last certain number of frames (e.g., last 10,000 frames). By this means, changes in the static environment (e.g., a parked car that drove away, or a tree that was cut), will be detected and reflected.

Now that the cell histogram is created and the static scene is extracted, dynamic objects are identified. More specifically, given the distribution D of the static environment, identification of measurements belonging to dynamic objects is straight forward using an outlier detection scheme. Any distance measurement d with:

$$d > \mu + k\sigma \quad \text{(Equation 8)}$$

is an indication of a dynamic object (e.g., k=3). However, due to sensor and environmental noise (e.g., strong wind), a single measurement above this threshold is not always evidence of the existence of a dynamic object. Thus, a second occupancy grid is generated to capture the probability for each cell that a dynamic object is present in the cell ($P_{dyn} \in [0,1]$). To achieve this, $P_{dyn}$ is defined for a given cell as follows:

$$P_{dyn} = \max\{1, \rho \cdot \Sigma_{d \in D} \mathbb{1}_d\}, \quad \text{(Equation 9)}$$

where ρ is a configurable parameter, and $\mathbb{1}_d$ is 1 if the following holds:

$$d > \mu + 3\sigma, \quad \text{(Equation 10)}$$

and otherwise 0. Hence, more measurements outside the distribution of the static environment D indicate a higher likelihood of a dynamic object in this cell.

This second grid is generated for a fixed point in time. For the next processing step at a next point in time, a new grid is generated. A tracker may be added to the identified object region to estimate the movement.

Furthermore, only minor adaptations to this step are required, if the cell histograms are generated considering all distance measurements. In this case, outliers are not given by:

$$d > \mu + 3\sigma. \quad \text{(Equation 11)}$$

Instead, a statistical mixture model (e.g., a Gaussian mixture model) may be used to express $\mathcal{S}_D$. Outliers may then be identified by checking all involved distributions.

Depending on the road type that is monitored, it might be advisable to remove all contributors to dynamic objects from the histograms after all aforementioned steps are performed. This avoids frequent dynamic objects starting to "falsify" the histogram. However, this should only be done after the initial settlement. For example, a trash bin that was positioned along the roadside would be flagged as a dynamic object using this method, which might not be desirable. On the other hand, on a crowded road this could be the step to avoid vehicles being filtered out after some operational time.

LiDAR information may be sparse. Dependent on the LiDAR resolution and the area that should be covered, there might be cells of the image histogram where LiDAR beams bypass at a certain distance, without any beam hitting the ground floor. Thus, if there is no dynamic object present, there will not be a distance measurement entered into the corresponding image histogram cell. Yet, if a dynamic object traverses the cell, this might be hit by the LiDAR beams. Consequently, the histogram of such a cell only includes measurements of dynamic objects. As a result, after settlement there will be one distribution that this is considered to be part of the static environment.

To address that issue, the frequency with which new LiDAR information is used is entered into a cell, $f_{update}$. This may be calculated by the amount of times that the cell i has been updated and the overall number of frames that have been processed.

$$f_{update\ i} = \frac{\#update_i}{\#frames} \quad \text{(Equation 12)}$$

A cell that includes measurements belonging to the static scene environment are usually hit regularly by LiDAR beams. In contrast, cells with only few measurements over time typically represent dynamic objects. Hence, we can distinguish between two types of cells.

High frequency cells are regularly updated by new measurements. These cells have a robust measurement of the static environment parts. Low frequency cells do not provide a measurement of the static environment (otherwise there would be regular measurements). Hence, judgments on the static environment are difficult. Nevertheless, for the purpose of detection of dynamic objects this is not necessarily a drawback. It is a fair assumption that any measurement within such a cell corresponds to a dynamic object.

Even a high frequency cell does not provide an updated measurement every frame, dynamic objects might lead to an occlusion of the cell in the LiDAR measurements. Hence, ideally the classification in high/low frequency cell is performed in the absence of any object. Nevertheless, over larger periods of time, both types of cells should be distinguished easily even in dense traffic.

Other possibilities to address missing static measurements for some cells include using a larger cell size when creating the histograms. This reduces the amount of uncovered areas. Another alternative is to transfer information about static measurements among adjacent cells, which however can also lead to false judgments if cell sizes are too large.

In a typical traffic monitoring configuration, multiple LiDAR sensors are used. Thus, the data is fused. An early fusion can be applied, which means that the cell histograms are generated using all available LiDAR data. Another option is to use a late-fusion approach for the image histogram. In this case, separate grids are generated for each sensor, and histograms include data from one sensor, resulting in "sharper" distributions. The fusion happens as last step when creating the grid including probability of a dynamic object $P_{dyn}$.

FIG. 4 illustrates a block diagram of an exemplary computing device 400 in accordance with aspects of the disclosure. The computing device 400 may be identified with a central controller and be implemented as any suitable network infrastructure component, which may be implemented as a cloud/edge network server, controller, computing device, etc. As further discussed below, the computing device 400 may serve the safety system 130, 300 in accordance with the various techniques as discussed herein. Thus, the computing device 400 may perform the various functionality as described herein with respect to generating distance histogram images over time, wherein the distance histogram images include the measured distance information in corresponding pixels, performing a distribution-based outlier analysis on the distance histogram images to classify each pixel of each of the received images as either an outlier pixel representing a dynamic object or a non-outlier pixel representing a static portion of the environment, and tracking the dynamic object over time and trigger a maneuver by the autonomous agent if a distance between the dynamic object and the autonomous agent becomes less than a predefined distance. To do so, the computing device 400 may include processing circuitry 402, a transceiver 404, communication interface 406, and a memory 408. The components shown in FIG. 4 are provided for ease of explanation, and the computing device 400 may implement additional, less, or alternative components as those shown in FIG. 4.

The processing circuitry 402 may be configured as any suitable number and/or type of computer processors, which may function to control the computing device 400. The processing circuitry 402 may be identified with one or more processors (or suitable portions thereof) implemented by the computing device 400. The processing circuitry 402 may be identified with one or more processors such as a host processor, a digital signal processor, one or more microprocessors, graphics processors, baseband processors, microcontrollers, an application-specific integrated circuit (ASIC), part (or the entirety of) a field-programmable gate array (FPGA), etc.

In any event, the processing circuitry 402 may be configured to carry out instructions to perform arithmetical, logical, and/or input/output (I/O) operations, and/or to control the operation of one or more components of computing device 400 to perform various functions as described herein. The processing circuitry 402 may include one or more microprocessor cores, memory registers, buffers, clocks, etc., and may generate electronic control signals associated with the components of the computing device 400 to control and/or modify the operation of these components. The processing circuitry 402 may communicate with and/or control functions associated with the transceiver 404, the communication interface 406, and/or the memory 408. The processing circuitry 402 may additionally perform various operations to control the communications, communications scheduling, and/or operation of other network infrastructure components that are communicatively coupled to the computing device 400.

The transceiver 404 may be implemented as any suitable number and/or type of components configured to transmit and/or receive data packets and/or wireless signals in accordance with any suitable number and/or type of communication protocols. The transceiver 404 may include any suitable type of components to facilitate this functionality, including components associated with known transceiver, transmitter, and/or receiver operation, configurations, and implementations. Although depicted in FIG. 4 as a transceiver, the transceiver 404 may include any suitable number of transmitters, receivers, or combinations of these that may be integrated into a single transceiver or as multiple transceivers or transceiver modules. The transceiver 404 may include components typically identified with an RF front end and include, for example, antennas, ports, power amplifiers (PAs), RF filters, mixers, local oscillators (LOs), low noise amplifiers (LNAs), up-converters, down-converters, channel tuners, etc.

The communication interface 406 may be configured as any suitable number and/or type of components configured to facilitate the transceiver 404 receiving and/or transmitting data and/or signals in accordance with one or more communication protocols, as discussed herein. The communication interface 406 may be implemented as any suitable number and/or type of components that function to interface with the transceiver 406, such as analog-to-digital converters (ADCs), digital to analog converters, intermediate frequency (IF) amplifiers and/or filters, modulators, demodulators, baseband processors, etc. The communication interface 406 may thus work in conjunction with the transceiver 404 and form part of an overall communication circuitry implemented by the computing device 400, which may be implemented via the computing device 400 to transmit commands and/or control signals to the AMRs 111 to execute any of the functions describe herein.

The memory 408 is configured to store data and/or instructions such that, when the instructions are executed by the processing circuitry 402, cause the computing device 400 to perform various functions as described herein. The memory 408 may be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 408 may be non-removable, removable, or a combination of both. The memory 408 may be implemented as a non-transitory computer readable medium storing one or more executable instructions such as, for example, logic, algorithms, code, etc.

As further discussed below, the instructions, logic, code, etc., stored in the memory 408 are represented by the various modules/engines as shown in FIG. 4. Alternatively, if implemented via hardware, the modules/engines shown in FIG. 4 associated with the memory 408 may include instructions and/or code to facilitate control and/or monitor the operation of such hardware components. In other words, the modules/engines as shown in FIG. 4 are provided for ease of explanation regarding the functional association between hardware and software components. Thus, the processing circuitry 402 may execute the instructions stored in these respective modules/engines in conjunction with one or more hardware components to perform the various functions as discussed herein.

The histogram generation module 404 may execute the functionality described herein for the generation of distance histogram images over time, wherein the distance histogram images include the measured distance information in corresponding picture elements.

The distribution-based outlier analysis module 411 may perform a distribution-based outlier analysis on the distance histogram images to classify each picture element of each of the received images as either an outlier picture element representing a dynamic object or a non-outlier picture element representing a static portion of the environment.

The dynamic object tracking module 413 may track the dynamic object over time.

The maneuver triggering module 415 may trigger a maneuver by the autonomous agent if a distance between the dynamic object and the autonomous agent becomes less than a predefined distance.

The techniques of this disclosure may also be described in the following examples.

Example 1. An apparatus, comprising: an interface configured to receive images with measured distance information of an environment of an autonomous agent; and processing circuitry that is configured to: generate distance histogram images over time, wherein the distance histogram images include the measured distance information in corresponding picture elements; perform a distribution-based outlier analysis on the distance histogram images to classify each picture element of each of the received images; and track a dynamic object over time and cause an action by the autonomous agent if it is determined, based on a result of distribution-based outlier analysis, that a distance between the dynamic object and the autonomous agent is less than a predefined distance.

Example 2. The apparatus of example 1, wherein the processing circuitry is configured to: perform the distribution-based outlier analysis on the distance histogram images to classify each picture element of each of the received images as either an outlier picture element representing the dynamic object or a non-outlier picture element representing a static portion of the environment.

Example 3. The apparatus of example 2, wherein the processing circuitry is configured to: identify, based on location information of the autonomous agent, any outlier picture elements representing a portion of the autonomous agent, and ignore any identified outlier picture elements.

Example 4. The apparatus of any of examples 2-3, wherein the processing circuitry is configured to: fuse the outlier picture elements representing the dynamic object based on the images from a plurality of sensors with different fields-of-view; and identify the dynamic object based on the fused outlier picture elements.

Example 5. The apparatus of any of examples 2-4, wherein the processing circuitry is configured to: generate dynamic images comprising the outlier picture elements representing the dynamic object alone.

Example 6. The apparatus of any of examples 2-5, wherein the processing circuitry is configured to: generate a static image comprising the non-outlier picture elements representing the static portion of the environment alone, wherein the static image is a complement of a dynamic image comprising the outlier picture elements representing the dynamic object.

Example 7. The apparatus of any of examples 1-6, wherein the distance histogram images are based on Gaussian distributions.

Example 8. The apparatus of any of examples 1-7, wherein the processing circuitry is configured to: convert the measured distance information into a cartesian space of the autonomous agent.

Example 9. The apparatus of any of examples 1-8, wherein the processing circuitry is located in a cloud or at an edge.

Example 10. The apparatus of any of examples 2-9, wherein the processing circuitry is configured to classify an individual picture element as an outlier picture element or a non-outlier picture element by comparing its Gaussian distribution against Gaussian distributions of other picture elements.

Example 11. A non-transitory computer-readable medium having stored thereon instructions that, when executed by processing circuitry, cause the processing circuitry to: receive images with measured distance information of an environment of an autonomous agent; generate distance histogram images over time, wherein the distance histogram images include the measured distance information in corresponding picture elements; perform a distribution-based outlier analysis on the distance histogram images to classify each picture element of each of the received images; and track a dynamic object over time and cause an action by the autonomous agent if it is determined, based on a result of the distribution-based outlier analysis, that a distance between the dynamic object and the autonomous agent is less than a predefined distance.

Example 12. The non-transitory computer-readable medium of example 11, wherein the instructions further cause the processing circuitry to: perform the distribution-based outlier analysis on the distance histogram images to classify each picture element of each of the received images as either an outlier picture element representing the dynamic object or a non-outlier picture element representing a static portion of the environment.

Example 13. The non-transitory computer-readable medium of example 12, wherein the instructions further cause the processing circuitry to: identify, based on location information of the autonomous agent, any outlier picture elements representing a portion of the autonomous agent, and ignore any identified outlier picture elements.

Example 14. The non-transitory computer-readable medium of any of examples 12-3, wherein the instructions further cause the processing circuitry to: generate dynamic images comprising the outlier picture elements representing the dynamic object alone.

Example 15. The non-transitory computer-readable medium of any of examples 12-14, wherein the instructions further cause the processing circuitry to: generate a static image comprising the non-outlier picture elements representing the static portion of the environment alone, wherein the static image is a complement of a dynamic image comprising the outlier picture elements representing the dynamic object.

Example 16. The non-transitory computer-readable medium of any of examples 11-15, wherein the distance histogram images are based on Gaussian distributions.

Example 17. The non-transitory computer-readable medium of any of examples 11-16, wherein the instructions further cause the processing circuitry to: convert the measured distance information into a cartesian space of the autonomous agent.

Example 18. The non-transitory computer-readable medium of any of examples 11-17, wherein the processing circuitry is located in a cloud or at an edge.

Example 19. The non-transitory computer-readable medium of any of examples 12-18, wherein the instructions further cause the processing circuitry to classify an individual picture element as an outlier picture element or a non-outlier picture element by comparing its Gaussian distribution against Gaussian distributions of other picture elements.

Example 20. The non-transitory computer-readable medium of any of examples 12-19, wherein the instructions further cause the processing circuitry to: fuse the outlier picture elements representing the dynamic object based on the images from a plurality of sensors with different fields-of-view; and identify the dynamic object based on the fused outlier picture elements.

Example 21. An apparatus, comprising: an interface means for receiving images with measured distance information of an environment of an autonomous agent; and processing means for: generating distance histogram images over time, wherein the distance histogram images include the measured distance information in corresponding picture elements; performing a distribution-based outlier analysis on the distance histogram images to classify each picture element of each of the received images; and tracking a dynamic object over time and cause an action by the autonomous agent if it is determined, based on a result of the distribution-based outlier analysis, that a distance between the dynamic object and the autonomous agent is less than a predefined distance.

Example 22. The apparatus of example 21, wherein the processing means is for: performing the distribution-based outlier analysis on the distance histogram images to classify each picture element of each of the received images as either an outlier picture element representing the dynamic object or a non-outlier picture element representing a static portion of the environment.

Example 23. The apparatus of example 22, wherein the processing means is for: identifying, based on location information of the autonomous agent, any outlier picture elements representing a portion of the autonomous agent, and ignore any identified outlier picture elements.

Example 24. The apparatus of any of examples 22-23, wherein the processing means is for: generating dynamic images comprising the outlier picture elements representing the dynamic object alone.

Example 25. The apparatus of example 22, wherein the processing means is for: generating a static image comprising the non-outlier picture elements representing the static portion of the environment alone, wherein the static image is a complement of a dynamic image comprising the outlier picture elements representing the dynamic object.

Example 26. The apparatus of any of examples 22-23, wherein the processing means is for: fusing the outlier picture elements representing the dynamic object based on the images from a plurality of sensors with different fields-of-view; and identifying the dynamic object based on the fused outlier picture elements.

Example 27. The apparatus of any of examples 21-26, wherein the distance histogram images are based on Gaussian distributions.

Example 28. The apparatus of any of examples 21-27, wherein the processing means is for: converting the measured distance information into a cartesian space of the autonomous agent.

Example 29. The apparatus of any of examples 21-28, wherein the processing means is located in a cloud or at an edge.

Example 30. The apparatus of any of examples 22-29, wherein the processing means is for: classifying an individual picture element as an outlier picture element or a non-outlier picture element by comparing its Gaussian distribution against Gaussian distributions of other picture elements.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. An apparatus, comprising:
an interface configured to receive images with measured distance information of an environment of an autonomous agent; and
processing circuitry that is configured to:
generate distance histogram images over time, wherein the distance histogram images include the measured distance information in corresponding picture elements;
perform a distribution-based outlier analysis on the distance histogram images to classify each picture element of each of the received images; and
track a dynamic object over time and cause an action by the autonomous agent if it is determined, based on a result of distribution-based outlier analysis, that a distance between the dynamic object and the autonomous agent is less than a predefined distance.

2. The apparatus of claim 1, wherein the processing circuitry is configured to:
perform the distribution-based outlier analysis on the distance histogram images to classify each picture element of each of the received images as either an outlier picture element representing the dynamic object or a non-outlier picture element representing a static portion of the environment.

3. The apparatus of claim 2, wherein the processing circuitry is configured to:
identify, based on location information of the autonomous agent, any outlier picture elements representing a portion of the autonomous agent, and ignore any identified outlier picture elements.

4. The apparatus of claim 2, wherein the processing circuitry is configured to:
fuse the outlier picture elements representing the dynamic object based on the received images from a plurality of sensors with different fields-of-view; and
identify the dynamic object based on the fused outlier picture elements.

5. The apparatus of claim 2, wherein the processing circuitry is configured to:
generate dynamic images comprising the outlier picture elements representing the dynamic object alone.

6. The apparatus of claim 2, wherein the processing circuitry is configured to:
generate a static image comprising the non-outlier picture elements representing the static portion of the environment alone, wherein the static image is a complement of a dynamic image comprising the outlier picture elements representing the dynamic object.

7. The apparatus of claim 1, wherein the distance histogram images are based on Gaussian distributions.

8. The apparatus of claim 1, wherein the processing circuitry is configured to:
convert the measured distance information into a cartesian space of the autonomous agent.

9. The apparatus of claim 1, wherein the processing circuitry is located in a cloud or at an edge.

10. The apparatus of claim 2, wherein the processing circuitry is configured to classify an individual picture element as an outlier picture element or a non-outlier picture element by comparing its Gaussian distribution against Gaussian distributions of other picture elements.

11. A non-transitory computer-readable medium having stored thereon instructions that, when executed by processing circuitry, cause the processing circuitry to:
receive images with measured distance information of an environment of an autonomous agent;
generate distance histogram images over time, wherein the distance histogram images include the measured distance information in corresponding picture elements;
perform a distribution-based outlier analysis on the distance histogram images to classify each picture element of each of the received images; and
track a dynamic object over time and cause an action by the autonomous agent if it is determined, based on a result of the distribution-based outlier analysis, that a distance between the dynamic object and the autonomous agent is less than a predefined distance.

12. The non-transitory computer-readable medium of claim 11, wherein the instructions further cause the processing circuitry to:
perform the distribution-based outlier analysis on the distance histogram images to classify each picture element of each of the received images as either an outlier picture element representing the dynamic object or a non-outlier picture element representing a static portion of the environment.

13. The non-transitory computer-readable medium of claim 12, wherein the instructions further cause the processing circuitry to:
identify, based on location information of the autonomous agent, any outlier picture elements representing a portion of the autonomous agent, and ignore any identified outlier picture elements.

14. The non-transitory computer-readable medium of claim 12, wherein the instructions further cause the processing circuitry to:
generate dynamic images comprising the outlier picture elements representing the dynamic object alone.

15. The non-transitory computer-readable medium of claim 12, wherein the instructions further cause the processing circuitry to:
generate a static image comprising the non-outlier picture elements representing the static portion of the environment alone, wherein the static image is a complement of a dynamic image comprising the outlier picture elements representing the dynamic object.

16. The non-transitory computer-readable medium of claim 11, wherein the distance histogram images are based on Gaussian distributions.

17. The non-transitory computer-readable medium of claim 11, wherein the instructions further cause the processing circuitry to:
convert the measured distance information into a cartesian space of the autonomous agent.

18. The non-transitory computer-readable medium of claim 11, wherein the processing circuitry is located in a cloud or at an edge.

19. The non-transitory computer-readable medium of claim 12, wherein the instructions further cause the processing circuitry to classify an individual picture element as an outlier picture element or a non-outlier picture element by comparing its Gaussian distribution against Gaussian distributions of other picture elements.

20. The non-transitory computer-readable medium of claim 12, wherein the instructions further cause the processing circuitry to:
fuse the outlier picture elements representing the dynamic object based on the received images from a plurality of sensors with different fields-of-view; and
identify the dynamic object based on the fused outlier picture elements.

21. An apparatus, comprising:
an interface means for receiving images with measured distance information of an environment of an autonomous agent; and
processing means for:
generating distance histogram images over time, wherein the distance histogram images include the measured distance information in corresponding picture elements;
performing a distribution-based outlier analysis on the distance histogram images to classify each picture element of each of the received images; and
tracking a dynamic object over time and cause an action by the autonomous agent if it is determined, based on a result of the distribution-based outlier analysis, that a distance between the dynamic object and the autonomous agent is less than a predefined distance.

22. The apparatus of claim 21, wherein the processing means is for:
performing the distribution-based outlier analysis on the distance histogram images to classify each picture element of each of the received images as either an outlier picture element representing the dynamic object or a non-outlier picture element representing a static portion of the environment.

23. The apparatus of claim 22, wherein the processing means is for:
identifying, based on location information of the autonomous agent, any outlier picture elements representing a portion of the autonomous agent, and ignore any identified outlier picture elements.

24. The apparatus of claim 22, wherein the processing means is for:
generating dynamic images comprising the outlier picture elements representing the dynamic object alone.

25. The apparatus of claim 22, wherein the processing means is for:
generating a static image comprising the non-outlier picture elements representing the static portion of the environment alone, wherein the static image is a complement of a dynamic image comprising the outlier picture elements representing the dynamic object.

* * * * *